US 012406450B2

(12) United States Patent
Cardelino et al.

(10) Patent No.: US 12,406,450 B2
(45) Date of Patent: Sep. 2, 2025

(54) METHODS AND SYSTEMS FOR GENERATING AUGMENTED REALITY (AR) OBJECTS FOR USE TO IMPLEMENT FUNCTIONS OF AN ELECTRONIC PROGRAM

(71) Applicant: Ulta Salon, Cosmetics & Fragrance, Inc., Bolingbrook, IL (US)

(72) Inventors: Juan Cardelino, Montevideo (UY); Javier Camacho, Montevideo (UY); María Eugenia Baliño, Bolingbrook, IL (US); Agustina Sartori, San Francisco, CA (US)

(73) Assignee: Ulta Salon, Cosmetics & Fragrance, Inc., Bolingbrook, IL (US)

( * ) Notice: Subject to any disclaimer, the term of this patent is extended or adjusted under 35 U.S.C. 154(b) by 173 days.

(21) Appl. No.: 18/532,412

(22) Filed: Dec. 7, 2023

(65) Prior Publication Data

US 2025/0191306 A1 Jun. 12, 2025

(51) Int. Cl.
*G06T 19/00* (2011.01)
(52) U.S. Cl.
CPC ................... *G06T 19/006* (2013.01)
(58) Field of Classification Search
None
See application file for complete search history.

(56) References Cited

U.S. PATENT DOCUMENTS

| 8,533,057 B2 | 9/2013 | Karlsson |
| 10,956,967 B2 | 3/2021 | Ayush et al. |
| 11,436,808 B2 | 9/2022 | Wang et al. |
| 11,443,511 B2 | 9/2022 | Bates et al. |
| 2022/0076083 A1 | 3/2022 | Amato et al. |

OTHER PUBLICATIONS

Yord, 5 Augmented Reality Ideas for Your Next Christmas Campaign, Nov. 15, 2023, retrieved from the Internet at https://yordstudio.com/5-augmented-reality-ideas-for-your-next-holiday-campaign on Dec. 7, 2023.
McDonald's AR Advent Calendar, retrieved from the Internet at https://www.blippar.com/work/mcdonalds on Dec. 7, 2023.
Cadbury AR Advent Calendar, retrieved from the Internet at https://www.blippar.com/work/cadbury on Dec. 7, 2023.

*Primary Examiner* — Nicholas R Wilson
(74) *Attorney, Agent, or Firm* — McDonnell Boehnen Hulbert & Berghoff LLP

(57) ABSTRACT

An example computer-implemented method for generating augmented reality (AR) objects for use to implement functions of an electronic program includes generating AR objects based on user data, generating functionalities of the AR objects dynamically per user, determining based on a camera feed received by the computing device a viewpoint that depicts a real-world environment, based on initiation of the electronic program at the computing device displaying the AR objects along with real images in the camera feed such that the real images are mixed with the AR objects and the AR objects are anchored to a physical location in the real-world environment, and electronically enabling access to a functionality of the AR objects in a time-sequenced manner based on meeting requirements for completion of the objectives of the electronic program.

20 Claims, 7 Drawing Sheets

METHODS AND SYSTEMS FOR GENERATING AUGMENTED REALITY (AR) OBJECTS FOR USE TO IMPLEMENT FUNCTIONS OF AN ELECTRONIC PROGRAM

FIELD

The present disclosure relates generally to methods and systems for generating augmented reality (AR) objects for use to implement functions of an electronic program, and more particularly to, electronically enabling access to a functionality of the AR objects in the time-sequenced manner based on meeting requirements for completion of the objectives of the electronic program.

BACKGROUND

A user can use an augmented reality device to provide enhanced or modified versions of an environment by adding digital features in a field of view. Existing augmented reality applications include games that overlay field of view, or information services that can retrieve information for objects in the field of view. Augmented reality applications thus merge virtual objects with images of the real environment of the user.

Augmented reality applications therefore present a challenge of merging the augmented reality objects with the images of the real environment in a way that provides a satisfactory user experience.

SUMMARY

Within examples, a computer-implemented method for generating augmented reality (AR) objects for use to implement functions of an electronic program is described. The method comprises receiving, at a computing device, an electronic program having objectives and associated rewards for completion of the objectives in a time-sequenced manner, and generating augmented reality (AR) objects based on user data. The AR objects are actionable via user input to provide a plurality of functionalities within the electronic program. The method also comprises generating the plurality of functionalities of the AR objects dynamically per user. The plurality of functionalities are initially restricted for use by the computing device. The method also comprises determining, based on a camera feed received by the computing device, a viewpoint that depicts a real-world environment, and based on initiation of the electronic program at the computing device, displaying the AR objects along with real images in the camera feed such that the real images are mixed with the AR objects and the AR objects are anchored to a physical location in the real-world environment. The method also comprises electronically enabling access to a functionality of the plurality of functionalities of the AR objects in the time-sequenced manner based on meeting requirements for completion of the objectives.

In another example, a non-transitory computer-readable media is described having stored therein executable instructions, which when executed by a computing device including one or more processors causes the computing device to perform functions. The functions comprise receiving an electronic program having objectives and associated rewards for completion of the objectives in a time-sequenced manner, and generating augmented reality (AR) objects based on user data. The AR objects are actionable via user input to provide a plurality of functionalities within the electronic program. The functions also comprise generating the plurality of functionalities of the AR objects dynamically per user, and the plurality of functionalities are initially restricted for use by the computing device. The functions also comprise determining, based on a camera feed received by the computing device, a viewpoint that depicts a real-world environment, and based on initiation of the electronic program at the computing device, displaying the AR objects along with real images in the camera feed such that the real images are mixed with the AR objects and the AR objects are anchored to a physical location in the real-world environment. The functions also comprise electronically enabling access to a functionality of the plurality of functionalities of the AR objects in a time-sequenced manner based on meeting requirements for completion of the objectives.

In another example, a system is described comprising one or more processors and non-transitory computer-readable media having stored therein instructions, which when executed by the one or more processors, causes the system to perform functions. The functions comprise receiving an electronic program having objectives and associated rewards for completion of the objectives in a time-sequenced manner, and generating augmented reality (AR) objects based on user data. The AR objects are actionable via user input to provide a plurality of functionalities within the electronic program. The functions also comprise generating the plurality of functionalities of the AR objects dynamically per user, and the plurality of functionalities are initially restricted for use. The functions also comprise determining, based on a camera feed received, a viewpoint that depicts a real-world environment, and based on initiation of the electronic program, displaying the AR objects along with real images in the camera feed such that the real images are mixed with the AR objects and the AR objects are anchored to a physical location in the real-world environment. The functions also comprise electronically enabling access to a functionality of the plurality of functionalities of the AR objects in a time-sequenced manner based on meeting requirements for completion of the objectives.

The features, functions, and advantages that have been discussed can be achieved independently in various examples or may be combined in yet other examples. Further details of the examples can be seen with reference to the following description and drawings.

BRIEF DESCRIPTION OF THE FIGURES

Examples, objectives and descriptions of the present disclosure will be readily understood by reference to the following detailed description of illustrative examples when read in conjunction with the accompanying drawings, where the following drawings illustrate examples as described below.

DETAILED DESCRIPTION

Disclosed examples will now be described more fully hereinafter with reference to the accompanying drawings. Several different examples are described and should not be construed as limited to all possible alternatives. Rather, these examples are described so that this disclosure is thorough and complete and fully conveys a scope of the disclosure to those skilled in the art.

Within examples, systems and methods described herein a computer-implemented method for generating augmented reality (AR) objects for use to implement functions of an electronic program includes generating AR objects based on user data and generating functionalities of the AR objects dynamically per user. Following, enabling access to a functionality of the AR objects is electronically enabled in a time-sequenced manner based on meeting requirements for completion of the objectives of the electronic program.

Implementations of this disclosure introduce new and efficient improvements in the ways in which products, services, and routines are offered or recommended to users through various AR and virtual experiences provided by the computing device. The implementations of the present disclosure also introduce new and efficient improvements in the ways that AR objects are provided for display by the computing device in time-sequenced manners and customized to specific users.

Figure 1:
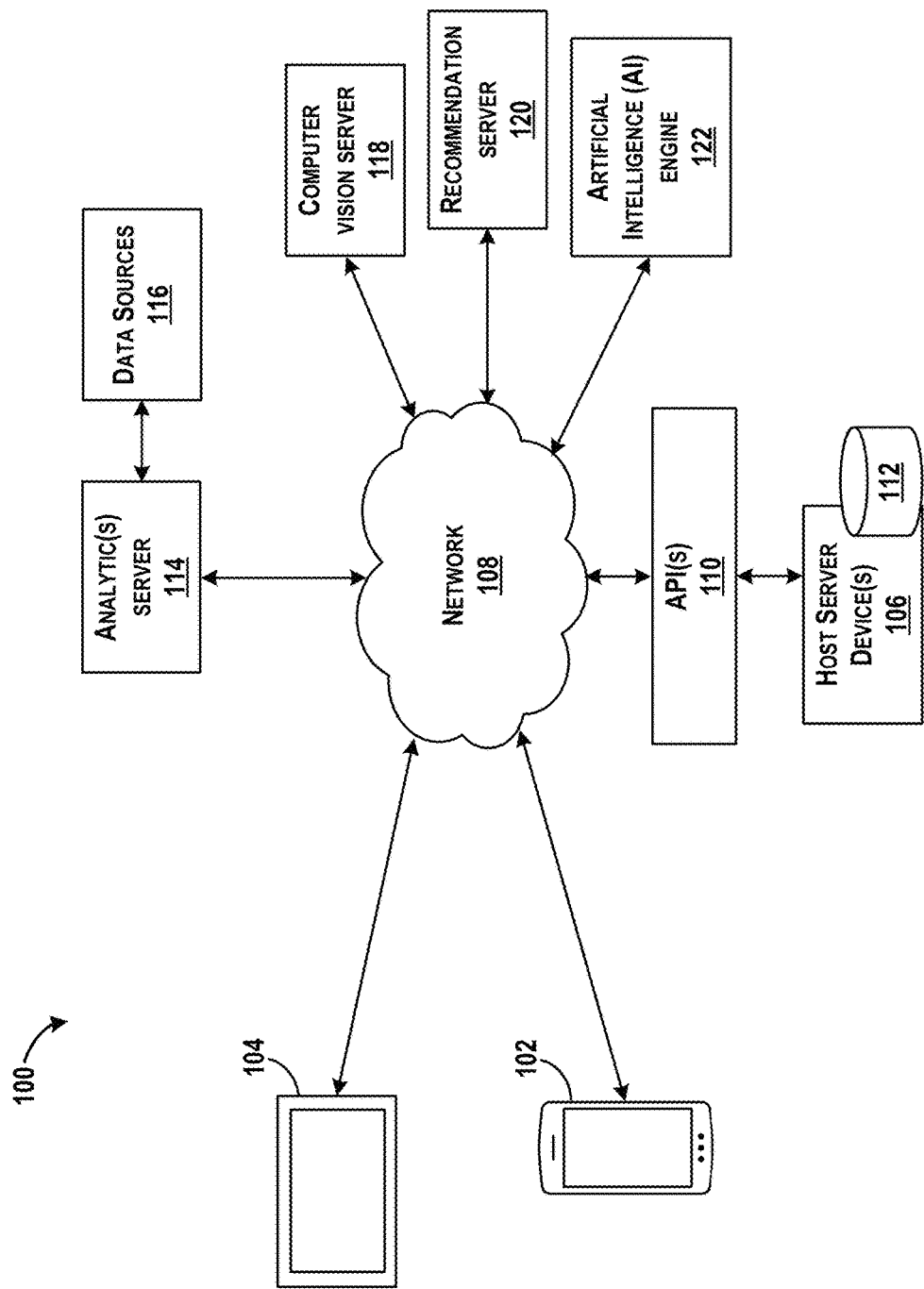
FIG. 1 is a block diagram illustrating an example of a networked computer system, according to an example implementation.

Referring to the figures, FIG. 1 is a block diagram illustrating an example of a networked computer system 100, according to an example implementation. The networked computer system 100 includes one or more client devices 102 and 104 coupled to one or more host server device(s) 106 via a network 108. The network 108 represents one or more local area networks (LANs), wide area networks (WANs), cellular networks, and/or other networks using any of wired, wireless, or satellite links, and may include the public Internet.

The client devices 102 and 104 can be a special purpose data processor, a general-purpose computer, smartphone, tablet, a computer system, a group of networked computers or computer systems configured to perform steps, functions, or modes of methods described herein. Further examples of the client devices 102 and 104 may include, without limitation, handheld computers, wearable devices, laptop computers, desktop computers, servers, portable media players, gaming devices, in-store kiosks, and so forth. According to one example, the client devices 102 and 104 are built on a personal computer platform, such as the Apple® or Android® platform. Although FIG. 1 illustrates two of the client devices 102 and 104, the networked computer system may include fewer or more of the client devices 102 and 104 operating at any time. The client devices 102 and 104 represent computing devices (and the terms client device and computing device are used interchangeably throughout), which can be portable in nature as described above.

The host server devices(s) 106 may include any number of computers, virtual machine instances, and/or data centers that are configured to host or execute one or more instances of host applications. The host server devices(s) 106 may be involved, directly or indirectly, in processing requests received from the client devices 102 and 104. The host server devices(s) 106 comprise, for example, one or more of a network device, a web server, an application server, a database server, etc. A collection of the host server devices (s) 106 may be configured to implement a network-based service. For example, a provider of a network-based service may configure one or more of the host server devices(s) 106 and host applications (e.g., one or more web servers, application servers, database servers, etc.) to collectively implement a network-based application.

The client devices 102 and 104 communicate with one or more host applications at the host server devices(s) 106 to exchange information. The communication between the client devices 102 and 104 and a host application may, for example, be based on the Hypertext Transfer Protocol (HTTP) or any other network protocol. Content delivered from the host application to the client devices 102 and 104 may include, for example, HTML documents, media content, etc. The communication between the client devices 102 and 104 and a host application may include sending various requests and receiving data packets. For example, the client devices 102 and 104 or an application running on the client devices 102 and 104 may initiate communication with a host application by making a request for a specific resource (e.g., based on an HTTP request), and the host server devices(s) 106 may respond with the requested content stored in one or more response packets.

Thus, one or more client applications may be executed at the client devices 102 and 104. Some applications executing at the client devices 102 and 104 may implement one or more application programming interfaces (APIs) 110. The APIs 110, for example, process inputs and control outputs of the client devices 102 and 104. For example, a client application executing at the client devices 102 and 104 accesses the host server device(s) 106 via the API 110 to retrieve configuration parameters for a particular electronic program. The client application then uses local image processing along with retrieved configuration parameters to generate visual media based on programmed functionalities of the electronic program.

The APIs 110 serve as an interface between the client devices 102 and 104 and the host server device(s) 106. One or more repositories and/or databases 112, which support certain utilities, store content required for implementing various electronic programs described herein, and is accessible by the host server device(s) 106. For example, the databases 112 store host applications, content (e.g., images/video), data related to image processing (e.g., image processing libraries, computer graphics, predefined visual effects, etc.), information relevant to the users (e.g., registration information or usage statistics), metadata, and any other data used in implementing the techniques described herein.

Thus, in some examples, techniques described herein are provided by an electronic program that is made accessible via a website or an application via the API 110. Alternatively, or in addition, techniques described herein are offered as an electronic program directly implementable on various devices or systems, such as on the client devices 102 and 104.

The networked computer system 100 also includes an analytic(s) server 114. The analytic(s) server 114 performs analytics on data related to usage behavior of the networked computer system 100. Such analytics may support other services including product recommendations and targeted marketing.

The networked computer system 100 also includes one or more data sources 116 accessible by the analytic(s) server 114. The data sources 116 generally refer to any sources from which data is received to implement features described herein. As a few illustrative examples, the data sources 116 include makeup product vendors, manufacturers, retailers, etc., content providers/licensing services, modeling services, and machine generated data sources such as server log files, activity log files, configuration files, messages, network packet data, performance measurements, sensor measurements, and the like.

The networked computer system 100 also includes a computer vision server 118. The computer vision server 118 is in communication with the client devices 102 and 104 and the host server device(s) 106 via the network 108 to receive visual media including a face, a body, or a portion of a face or body of a user, and process the visual media to generate information for a number of different physical characteristics of a user. The visual media can include a digital image, multiple frames of images, video, etc., and the images can include visible images (red, green, blue color images), infrared images, or other type of imaging based on cameras or sensors included on the client devices 102 and 104.

The computer vision server 118 includes computational ability to perform computer vision tasks for identifying and localizing a face in an image (e.g., using any number of algorithms such as the classical feature-based cascade classifier using the OpenCV library or a Multi-task Cascade convolutional neural network (MTCNN) via the MTCNN library) to find coordinates of the face in the image or demarcating an extent of the face (e.g., with a bounding box). Following, the computer vision server 118 identifies landmarks on the face (e.g., nose, eyes, lips, etc.) through any number of algorithms or through use of pre-trained models in a machine learning algorithm. The computer vision server 118 then outputs, to the host server device(s) 106 and/or to the client devices 102 and 104, information for physical characteristics of features of a user. Example physical characteristics include intrinsic properties of a face, such as shape of eyes, nose, cheek bones, etc.

The networked computer system 100 also includes a recommendation server 120. The recommendation server 120 can include or have access to a database containing product information, beauty services information, etc., which is accessible via the network 108 by the host server device(s) 106. In example operation, the host server device (s) 106 uses information from the computer vision server 118 to select or receive an applicable product, entity, or service from the recommendation server 120 that would address an identified physical characteristic of the user detected in the visual media.

The networked computer system 100 also includes an artificial intelligence (AI) engine 122. The AI engine 122 can include or have access to databases, such as the database 112 and/or data sources 116, to access data related to merchandise information and to a user profile for a user of the client devices 102 and 104 to identify retail information that may be considered relevant and related. The AI engine 122 generates outputs useful for modifying content and animation of the graphics presented for display on the client devices 102 and 104 to customize the content and animation of graphics for the user of the user profile accordingly. Reference to components including an "engine" or "module", described herein take the form of a computing device with a processor, memory, and executable instructions within examples. In addition, or alternatively, reference to an "engine" or "module" refers to a cloud computing service implementing cloud resources for computing power within examples.

Figure 2:
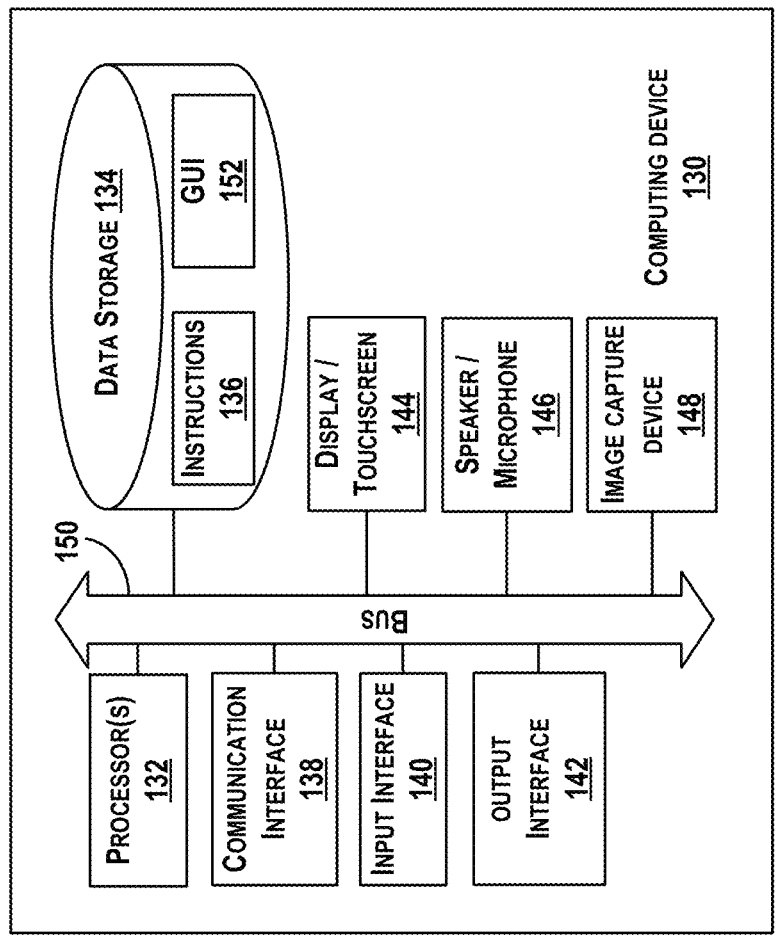
FIG. 2 illustrates a simplified block diagram of a computing device, such as one of the client devices of FIG. 1, according to an example implementation.

FIG. 2 illustrates a simplified block diagram of a computing device, such as one of the client devices 102 and 104 or other computing devices and servers described herein, according to an example implementation. FIG. 2 does not necessarily show all of the hardware and software modules included in the computing device 130, and omits physical and logical connections that will be apparent to one of ordinary skill in the art after review of the present disclosure.

The computing device 130 includes one or more processor(s) 132, and a non-transitory computer-readable media (data storage) 134 storing instructions 136, which when executed by the one or more processor(s) 132, causes the computing device 130 to perform functions (as described below). To perform functions, the computing device 130 includes a communication interface 138, an input interface 140, an output interface 142, a display/touchscreen 144, a speaker/microphone 146, and an image capture device 148, and each component of the computing device 130 is connected to a communication bus 150. The computing device 130 may also include hardware to enable communication within the computing device 130 and between the computing device 130 and other devices (not shown). The hardware may include transmitters, receivers, and antennas, for example.

The communication interface 138 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 138 is configured to receive input data from one or more devices, and configured to send output data to other devices.

The data storage 134 includes or takes the form of memory, such as one or more computer-readable storage media that can be read or accessed by the one or more processor(s) 132. The computer-readable storage media can include volatile and/or non-volatile storage components, such as optical, magnetic, organic or other memory or disc storage, which can be integrated in whole or in part with the one or more processor(s) 132. The non-transitory data storage 134 is considered non-transitory computer readable media. In some examples, the non-transitory data storage 134 can be implemented using a single physical device (e.g., one optical, magnetic, organic or other memory or disc storage unit), while in other examples, the non-transitory data storage 134 can be implemented using two or more physical devices. The non-transitory data storage 134 thus is a computer readable medium, and instructions 136 are stored thereon. The instructions 136 include computer executable code.

The data storage 134 further stores information executable by the processor(s) 132 to perform functions of a graphical user interface (GUI) 152 that allows users to interact with the computing device 130 through graphical icons and audio indicators, typed command labels or text navigation. The GUI 152 includes interactive elements selectable for providing input by a user or for receiving outputs by the GUI 152. The GUI 152 operates to provide information based on the electronic program that is executable to generate an interactive graphical representation of augmented reality (AR) objects, for examples.

The one or more processor(s) 132 is a general-purpose processor or special purpose processor (e.g., digital signal processors, application specific integrated circuits, etc.). The one or more processor(s) 132 receives inputs from the communication interface 138 as well as from other components (the display/touchscreen 144, the speaker/microphone 146, or the image capture device 148), and processes the inputs to generate outputs that are stored in the non-transitory data storage 134. The one or more processor(s) 132 can be configured to execute the instructions 136 (e.g., computer-readable program instructions) that are stored in the non-transitory data storage 134 and are executable to provide the functionality of the computing device 130 described herein.

The input interface 140 is used to enter data or commands and can include, for example, a keyboard, a scanner, a user pointing device such as, for example, a mouse, a trackball, or a touch pad, or may further include the touchscreen or microphone.

The output interface 142 outputs information for reporting or storage, and thus, the output interface 142 may be similar to the communication interface 138 and can be a wireless interface (e.g., transmitter) or a wired interface as well.

The image capture device 148 includes a digital camera including one or more optical sensors for conversion of received light to visual media such as digital information (e.g., charge-coupled devices (CCD), complementary metal-oxide semiconductor (CMOS) phototransistors, etc.). One type of visual media includes a single digital image, multiple digital images, and videos. In another example, the image capture device 148 includes a bar code reader, an optical scanning sensor, or other sensor capable of receiving a machine readable label (e.g., bar codes, quick response (QR) codes, or other arrangement of graphics or printed items). In another example, the image capture device 148 also includes software for pre-processing raw image data.

Depending on a type of the image capture device 148, various media are output from the image capture device 148 that include visual media and non-visual media. Examples of non-visual media include infrared (IR) images or data, and hyperspectral images or data. Still other types of media include media captured based on the visible light spectrum or other spectral bands such as ultra-violet (UV). A number of media captured and a type of media captured depends on image capture sensors or devices available or included on the computing device 130.

In some examples, when permissions are set accordingly by the user, the image capture device 148 is operated to capture visual media of the user, and the processor(s) 132 execute functions to identify objects in the captured visual media, such as a face of the user.

Within one example, in operation, when the instructions 136 are executed by the one or more processor(s) 132, the computing device 130 is caused to perform functions including receiving an electronic program having objectives and associated rewards for completion of the objectives in a time-sequenced manner, generating augmented reality (AR) objects based on user data that are actionable via user input to provide a plurality of functionalities within the electronic program, generating the plurality of functionalities of the AR objects dynamically per user that are initially restricted for use, determining based on a camera feed received a viewpoint that depicts a real-world environment, based on initiation of the electronic program displaying the AR objects along with real images in the camera feed such that the real images are mixed with the AR objects and the AR objects are anchored to a physical location in the real-world environment, and electronically enabling access to a functionality of the plurality of functionalities of the AR objects in a time-sequenced manner based on meeting requirements for completion of the objectives.

Figure 3:
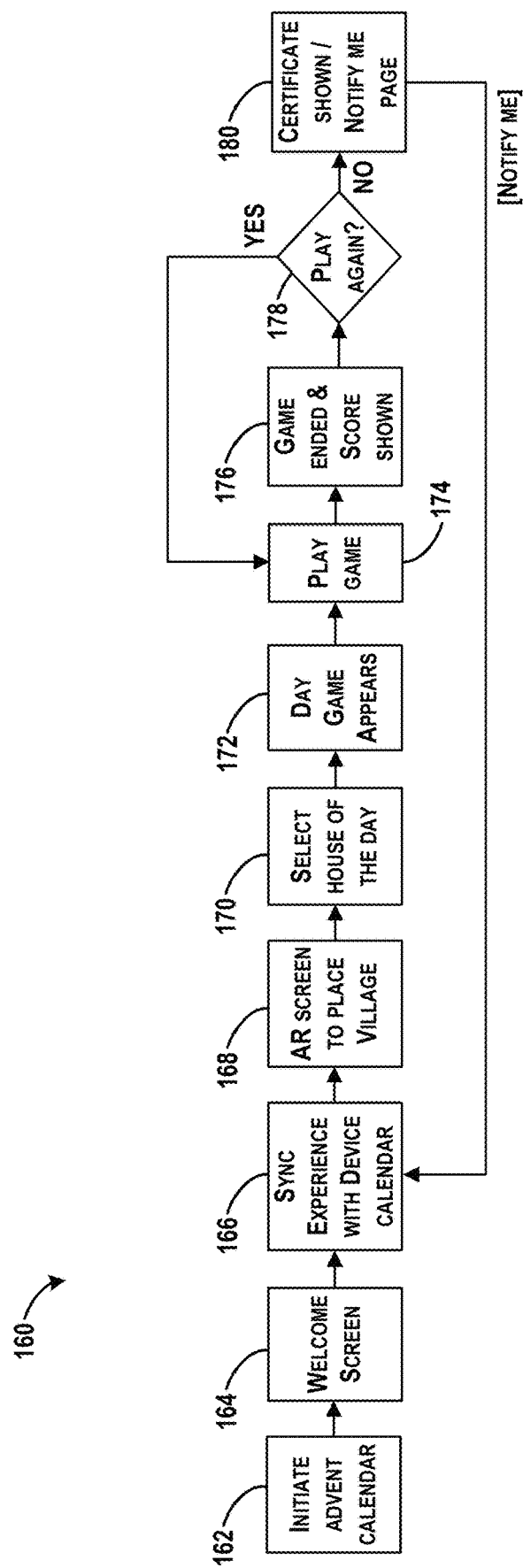
FIG. 3 is a flowchart illustrating an example of a computer-implemented method for generating AR objects for use to implement functions of an electronic program, according to an example implementation.

FIG. 3 is a flowchart illustrating an example of a computer-implemented method 160 for generating AR objects for use to implement functions of an electronic program, according to an example implementation. Method 160 shown in FIG. 3 presents an example of a method that could be used with the networked computer system 100, the computing devices 102 and 104, and/or the host server device(s) 106 shown in FIG. 1, for example. Method 160 also presents an example of functions to be performed to generate outputs for display by the GUI 152, as shown in FIG. 2, for example.

Within examples herein, an electronic program refers to a set of objectives and associated rewards for completion of the objectives in a time-sequenced manner. The program is implemented using AR objects to implement functionalities executable to complete the objectives.

In another example, the electronic program refers to the computer program product executable by a computing device to render AR objects and implement functionalities executable to complete the objectives.

In still another example, the electronic program refers to a combination of the set of objectives and associated rewards for completion of the objectives in a time-sequenced manner, and takes a form of the computer program product executable by a computing device to render AR objects and implement functionalities executable to complete the objectives.

Many types and examples of various electronic programs are possible. Some examples are provided below.

In one example, the electronic program represents a path to a goal as either a personnel or global experience. For a global experience, a group can be created that is going on vacation, where objectives and rewards are created for a "themed" experience.

In another example, the electronic program is associated with a product launch, and includes time-sequenced functionalities related to a timeline for the product launch. As objectives are completed, rewards (e.g., badges) are provided for performing specific tasks (purchasing products, sharing posts on social media, signing up for a store or product loyalty program, etc.).

In another example, as shown in FIG. 3, the electronic program provides for a digital advent calendar in which content of each day is dynamically determined, electronically accessible based on a date (e.g., specific day of week, month, etc.), and enables interactive experiences linked to products, coupons, discounts, or other brand surprises. Different AR experiences are provided each day to engage users in interactive manners differently for longer engagements. Thus, at block 162, the computing device 130 (e.g., one of the client devices 102 and 104) receives the electronic program and the advent calendar is initiated. At block 164, a welcome screen is displayed.

At block 166, the electronic program synchronizes with a calendar of the computing device. The electronic program provides for functionalities to be implemented and the functionalities are initially restricted for use by the computing device based on a day or based on a time. Certain functionalities are only capable of being performed on certain days, for example.

At block 168, the computing device 130 accesses the image capture device 148 to determine a viewpoint in a camera feed that depicts a real-world environment, and requests a user to select within the camera feed for placement of AR objects representative of an instantiation of the digital advent calendar. In one example, the digital advent calendar is represented by a village with separate houses, and each house has a door that, when selected, enables functionalities to be performed. The doors, however, are locked or initially restricted for use until a time-sequenced trigger occurs. The time-sequenced trigger includes, for example, a certain day or time.

Thus, the digital advent calendar is positioned in the user's world, and the computing device 130 displays the AR objects along with real images in the camera feed such that the real images are mixed with the AR objects and the AR objects are anchored to a physical location in the real-world environment. The AR objects can be overlaid onto the camera feed as well, and may be resized or rotated by receiving inputs from the user of the computing device. The AR objects are programmed to perform various animation after display.

The electronic programs includes a planned activity for every separate day, and each house/door represents a separate day that is actionable only on the assigned day. The time-sequenced triggers that enable access to the functionalities of each AR object are in a linear timeline, for example. However, the access rules for functionalities of the AR objects can be unique and non-linear as well based on details of the electronic program.

At block 170, a user selects an AR object of the day, such as a house designated for a current day of the calendar. After selection, at block 172, functionalities of the AR object are implemented or enabled. In one example, functionalities include a game playable by the user, as shown at block 174, to engage the user and offer an electronic experience related to the electronic program.

At block 176, the game is ended and scores are shown. At block 178, the user may opt to play the game again. If not, at block 180, a certificate is shown with a notify me page requesting the electronic program to provide a notification to the computing device 130s indicating when a next AR object or functionality of an AR object is unlocked or unrestricted and electronically accessible by the computing device 130.

In the example electronic program described with respect to FIG. 3, time-sequenced triggers are used to drive engagement and cause a user to return to use the electronic program every day (e.g., to open doors of the village and perhaps receive rewards). The digital calendar can be based around holidays, life events (e.g., birthday, vacation, etc.) lifestyle events, or any desired set of days. Each day, a new AR object is functional such that electronic access to a functionality of the AR object is enabled. Such enablement can be provided by programmatic instructions of the electronic program or through communications (e.g., enablement command message) received from the host server device 106.

FIGS. 4-13 are example screenshots of segments of the electronic program executed by the computing device 130, according to an example implementation.

Figure 4:
FIG. 4 is an example screenshot of a welcome screen of the electronic program executed by the computing device, according to an example implementation.

In FIG. 4, upon initiation of the electronic program on the computing device 130, a welcome screen is displayed. The electronic program is synced with a calendar of the computing device 130 to match a content available to a day of the month. In FIG. 4, the welcome screen indicates day #1 is available for selection.

Figure 5:
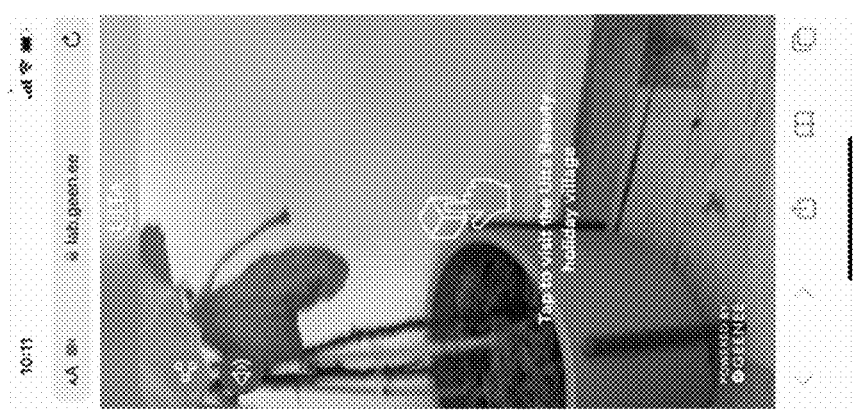
FIG. 5 is an example screenshot of a camera feed of the computing device, according to an example implementation.

In FIG. 5, after selecting day #1, a camera feed of the computing device 130 is initiated to illustrate a real-time feed in which the user is prompted to tap on the touchscreen to select a location to position AR objects of the electronic program.

Figure 6:
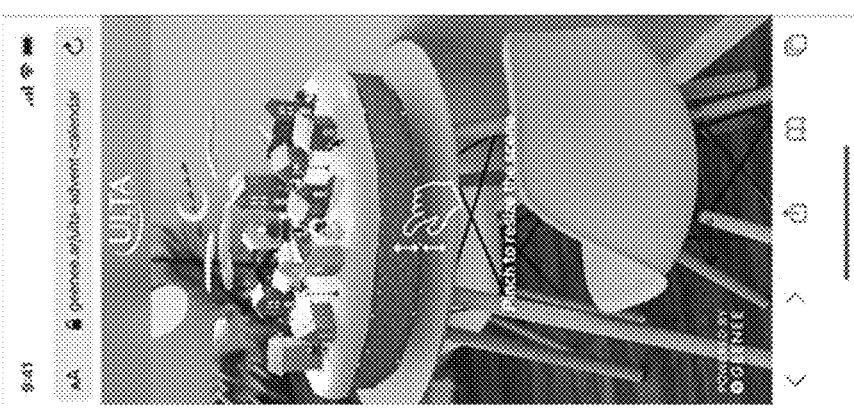
FIG. 6 is an example screenshot of placement of AR objects of the electronic program executed by the computing device, according to an example implementation.

In FIG. 6, the user selected a tabletop as a location to position the AR objects, and in this example, the AR objects are representative of a small village of houses in the wintertime. Thus, the AR objects including digital graphics are displayed along with real images in the camera feed such that the real images are mixed with the AR objects and the AR objects are anchored to a physical location in the real-world environment corresponding to the tabletop.

An anchor for an augmented reality experience (e.g., virtual reality mixed with real-world environment) indicates a position in the real-world (e.g., coordinates) at which to place the AR objects. The anchor can be a physical location, or can be an object. Image anchors are recognized and tracked using computer vision technology. Recognition is how the system determines whether the specified image anchor is on screen or in a field of view of the camera. The recognition process considers different orientations of the image, lighting conditions, camera noise, and other factors. Recognition is performed by a pre-process on the digital image to find high contrast edges, corners and other features. These pre-processed features can then be searched for in each processed camera frame to find a match. The system finds where in the camera frame the anchor is located, and what 3D orientation it has. Tracking builds upon recognition to interpolate the image anchor position between frames. This allows the anchored content to appear to stick to the image anchor when the image anchor or the camera moves.

Figure 7:
FIG. 7 is an example screenshot of a notification displayed overlaying the AR objects of the electronic program executed by the computing device, according to an example implementation.

In FIG. 7, upon placement of the AR objects, a notification is displayed overlaying the AR objects prompting the user to engage with interactive elements by selecting a particular AR objects associated with an active day. Some of the AR objects will be restricted for use, for example, by being associated with future day activities. The user may select the AR object corresponding to a current day (e.g., a house graphic with day #1) to initiate functionalities of the AR object.

Figure 8:
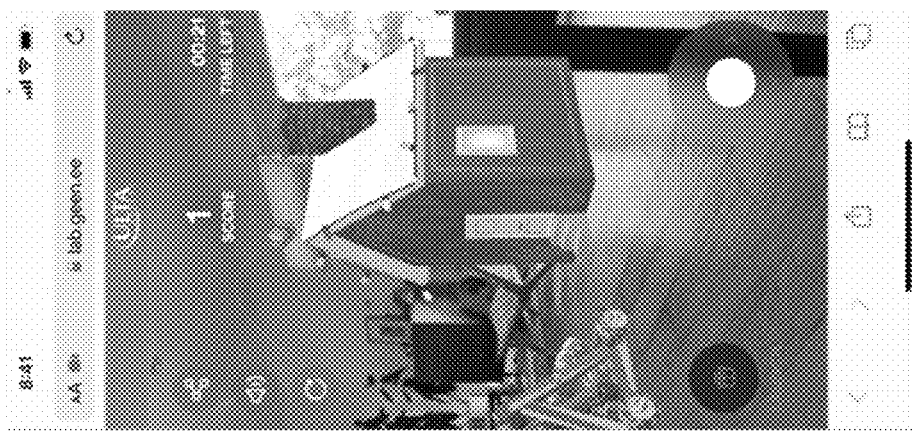
FIG. 8 is an example screenshot of an example functionality for a selected AR object of the electronic program executed by the computing device, according to an example implementation.

In FIG. 8, an example functionality for a selected AR object is shown. In this example, a game is initiated including a catapult to launch candies at the house.

Figure 9:
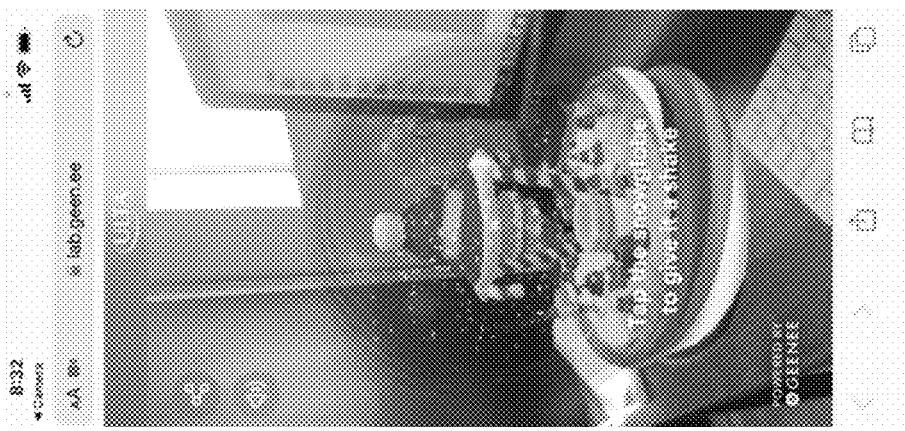
FIG. 9 is an example screenshot of another example functionality for a selected AR object of the electronic program executed by the computing device, according to an example implementation.

In FIG. 9, another example functionality for a selected AR object is shown. In this example, a digital snow globe is presented and inputs provided to the computing device 130 cause the snow globe to shake.

Figure 10:
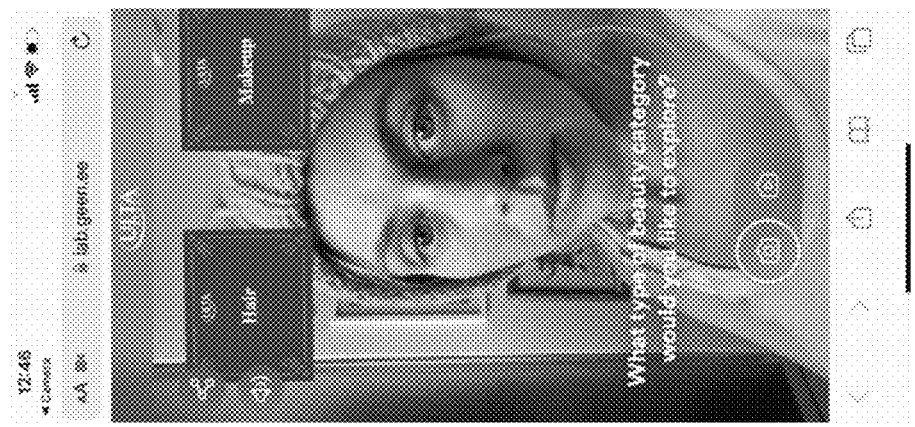
FIG. 10 is an example screenshot of another example functionality for a selected AR object of the electronic program executed by the computing device, according to an example implementation.

In FIG. 10, another example functionality for a selected AR object is shown. In this example, a beauty quiz is presented to the user and prompts are provided requesting the user to enable a front-facing camera and tilt their head side to side to capture images. The computing device 130 performs image processing to suggest a cosmetic product for a virtual try-on experience, such as related to hair or makeup, for example.

The examples shown in FIGS. 8-10 are illustrative only, and functionalities of the AR objects include more or fewer functionalities as well. Other examples include conceptually opening presents upon which discount codes or coupons are provided for selected products, various other electronic games, or image filters provided contextually related to a time of year or weather to create digitally modified images. Any type of functionality is possible for the AR objects, and functionalities are related to a subject or content of the electronic program to engage the user in an overall experience.

Figure 11:
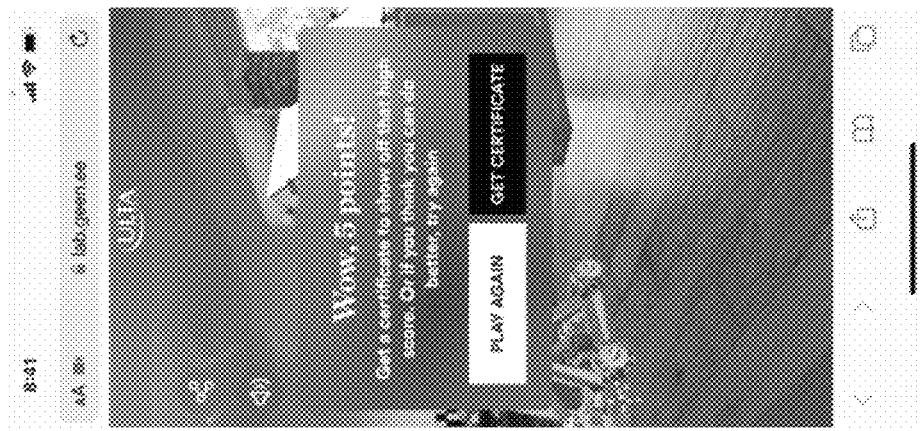
FIG. 11 is an example screenshot of a score screen displayed on the computing device, according to an example implementation.

In FIG. 11, following execution of the functionality of the AR object, a score screen is displayed on the computing device 130.

Figure 12:
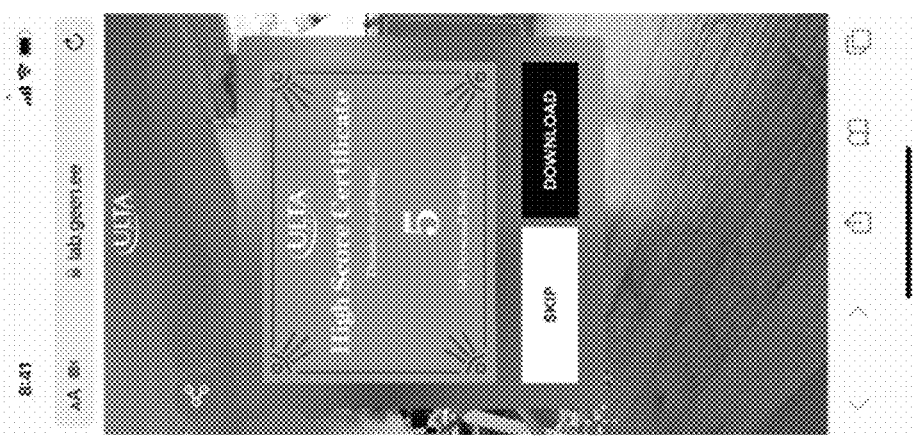
FIG. 12 is an example screenshot of a digital certificate provided to the user, according to an example implementation.

In FIG. 12, upon completion of the functionality of the AR object, a digital certificate is provided to the user to demonstrate completion of objectives and reward achievements.

Figure 13:
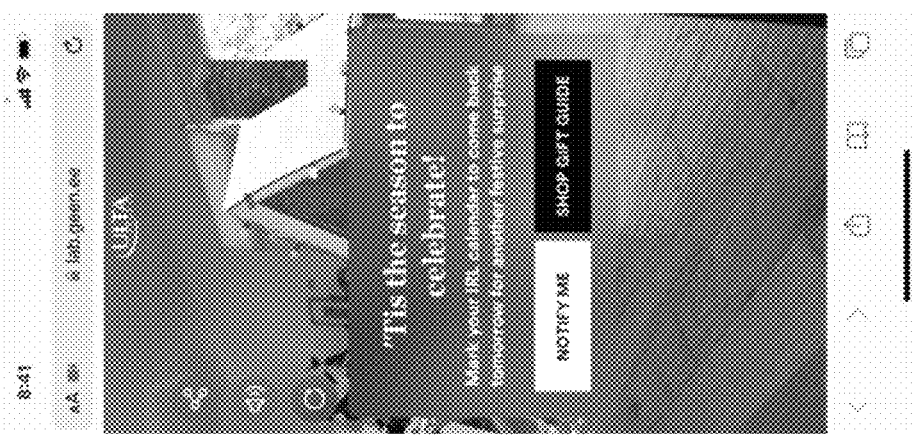
FIG. 13 is an example screenshot of a final screen displayed on the computing device, according to an example implementation.

In FIG. 13, a final screen is displayed on the computing device 130 prompting the user to be notified when additional functionalities of the AR objects will be unlocked and electronically accessible on the computing device 130. In one example where the electronic program represents a digital AR calendar, each AR object is associated with a different day of a month, and functionalities of the AR objects become electronically accessible by the computing device 130 in the time-sequenced manner, for example.

Figure 14:
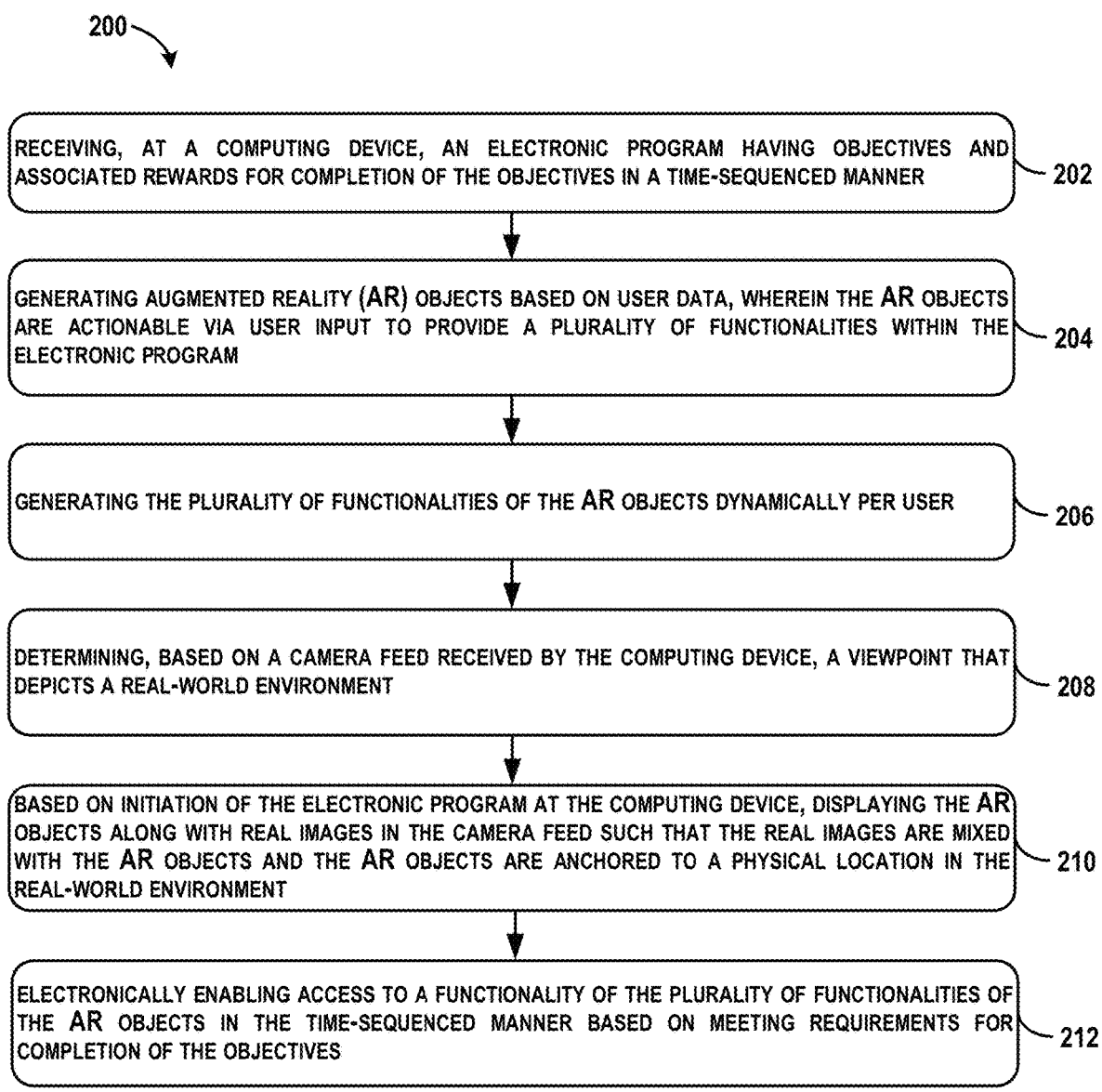
FIG. 14 is a flowchart illustrating an example of a computer-implemented method for generating augmented reality (AR) objects for use to implement functions of an electronic program, according to an example implementation.

FIG. 14 is a flowchart illustrating an example of a computer-implemented method 200 for generating augmented reality (AR) objects for use to implement functions of an electronic program, according to an example implementation. Method 200 shown in FIG. 14 presents an example of a method that could be used with the networked computer system 100, the client devices 102 and 104, and/or the host server device(s) 106 shown in FIG. 1, for example. Method 200 also presents an example of functions to be performed to generate outputs for display by the GUI 152, for example.

Within examples, devices or systems described herein are used or configured to perform logical functions presented in FIG. 14. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 200 includes one or more operations, functions, or actions as illustrated by one or more of blocks 202-2128. Although the blocks are illustrated in a sequential order, these blocks may also be performed in parallel, and/or in a different order than those described herein. In addition, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). The computer readable medium additionally or alternatively includes non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 14, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes receiving, at a computing device, an electronic program having objectives and associated rewards for completion of the objectives in a time-sequenced manner. In some examples, the electronic program is sent from the host server device 106 to the client devices 102 and 104 (e.g., representative of the computing device 130).

In some examples, when permissions are set accordingly by the user, the computing device 130 analyzes digital images stored in a photo library on the computing device 130 or associated with a user profile of the computing device 130 to perform image processing including object recognition and facial recognition on the images. Outputs of the image processing can be used as a basis for subject matter of an electronic program to be sent from the host server device 106. Within an example, an electronic program associated with hair care products is selected and sent to the computing device 130 based on the computing device 130 capturing an image of a hair care product that is processed and identified accordingly (e.g., via components of the network 100 in FIG. 1 such as the computer vision server 118).

In another example, the electronic program includes content related to specific products, and based on the user data being indicative of the specific products the host server device 106 sends the electronic program to the computing device 130. In a specific example, the electronic program is related to a hair care product, and based on the user data indicating prior purchases or online viewing of the hair care product, the electronic program will be sent to and received by the computing device 130 of the user. In this example, the computing device 130 includes a profile associated with the user, and the host server device 106 has access to user data to associate the electronic program to the computing device 130 of the user.

In further examples, the computing device 130 requests an electronic program to be sent from the host server device 106 that is related to certain subject matter. In a specific example, many electronic programs exist, and the user browses and selects an electronic program of interest based on content of the electronic program.

At block 204, the method 200 includes generating augmented reality (AR) objects based on user data, and the AR objects are actionable via user input to provide a plurality of functionalities within the electronic program. The AR objects include digital graphics to be overlaid onto a camera feed in a display of the computing device 130.

The user data is analyzed to generate AR objects accordingly. In one example, the electronic program includes content related to specific products, and block 204 includes generating the AR objects based on the specific products. When the user data relates to the specific products, the electronic program is provided and the AR objects can be made to have a look and appearance reflecting aspects of the specific products.

In other examples, block 204 additionally includes determining a geographic location of the computing device, and generating the AR objects based on the geographic location such that an appearance of the AR objects represents aspects of the geographic location. In the example illustration shown in FIG. 6, a geographic location of the computing device 130 may be in a cold environment or a rural setting, and the AR objects are generated to have a small town appearance with snow, for example.

In some examples, block 204 includes generating the AR objects utilizing a generative neural network to create the AR objects (digital representations of graphical items) in a customized manner to match a product or a brand that is a subject of the electronic program. For example, a generative artificial intelligence (GenAI) network is accessed to create digital graphics for the AR objects that represent the product or brand sponsoring the electronic program using components of the network 100 in FIG. 1. Data is input to the GenAI network, such as color schemes, product packaging, product labeling, product sizing, product usages, product marketing materials, etc., which is used to inform automated creation of the digital graphics.

In yet a further example, block 204 includes generating the AR objects to have an appearance based on the user data. Similar to above, when user data is indicative of certain products or brands (e.g., prior purchase history or online viewing experiences), a GenAI network is accessed to create digital graphics for the AR objects that represent that product or brand using same of similar product containers, labeling, and color schemes, for example. In this example, the electronic program provided to the computing device 130 also is selected based on the product or brand determined from an analysis of the user data.

In further examples, a look and appearance of the AR objects is related to a season, a time of day, or other contextual indicators of the computing device 130.

In some examples, the AR objects of the electronic program are generated or created to have a specific texture, look, and appearance based on any of the different inputs described herein, which is in contrast to selecting pre-existing AR objects from a database of samples. Generation of the AR objects on-the-fly includes full generation of the graphics or perhaps includes modifications of details to a look and appearance of the graphics (e.g., such as to modify aspects related to seasonal contexts, color schemes, etc.).

At block 206, the method 200 includes generating the plurality of functionalities of the AR objects dynamically per user, and the plurality of functionalities are initially restricted for use by the computing device. In one example, block 206 includes generating the plurality of functionalities of the AR objects further based on contextual indicators including one of the geographic location, a time of year, and a time of day.

In an example, the electronic program includes content related to a specific product, and block 206 includes generating the plurality of functionalities to include a virtual try-on simulation of the specific product by applying a digital rendering of the cosmetic product to an image of a person.

The functionalities can thus be different per user based on the input data available per user. The functionalities of the AR objects are then customizable per user to engage each user in a personalized manner.

The functionalities are initially restricted for use by the computing device so that selection of the AR objects does not result in the functionalities being performed. The AR objects are considered locked initially and not currently selectable or actionable to provide the generated functionalities.

At block 208, the method 200 includes determining, based on a camera feed received by the computing device, a viewpoint that depicts a real-world environment.

At block 210, the method 200 includes based on initiation of the electronic program at the computing device, displaying the AR objects along with real images in the camera feed such that the real images are mixed with the AR objects and the AR objects are anchored to a physical location in the real-world environment.

In one example, the electronic program includes content related to a specific product, and block 210 includes initiating the electronic program at the computing device based on performing an object recognition within a captured image of the specific product.

In some examples, the AR objects are anchored to the physical location in the real-world environment that corresponds to an object in the camera feed. In a specific instance, block 210 further includes receiving an input from a touch-screen of the computing device indicating a location in the camera feed to position the AR objects that corresponds to the physical location in the real-world environment, and displaying the AR objects along with real images at the location in the camera feed.

In further examples, a look and appearance of the AR objects is related to or based on a location in the world (e.g., table) at which the AR objects are positioned. In a specific example, if the AR objects are positioned in a bathroom versus a kitchen, the appearance of the objects matching context of the room would vary such as to include items commonly seen in a bathroom versus a kitchen.

In yet further examples, where the AR objects are positioned can affect functionalities of the AR objects. As a specific example, placement of the AR objects in the kitchen causes functionality of the AR objects to have food-related or food based games, interactions, functionalities, and experiences. Thus, context and location of placement of the AR object within a scene of the computing device 130 further contributes to selected or generated functionalities of the AR objects within some examples.

In some examples, block 210 requires usage of a camera of the computing device 130. User can opt-in to allow the electronic program to access a camera feed. In instances where a user declines to opt-in, a default option for providing a graphic background is selected by the computing device 130 and the AR objects are displayed overlaying the graphic background, for example.

At block 212, the method 200 includes electronically enabling access to a functionality of the plurality of functionalities of the AR objects in the time-sequenced manner based on meeting requirements for completion of the objectives. Electronically enabling access includes unlocking operation of the AR objects for use by a user of the computing device 130. In one example, electronically enabling access includes receiving a grant message or notification from the host server device 106 with an unlock key or authentication required to unlock the operation of the AR objects.

In one example, block 212 includes electronically enabling access to the functionality of the plurality of functionalities of the AR objects in the time-sequenced manner such that a single AR object is functional at a time. In some instances, each of the AR objects has an associated set of objectives, and block 212 includes electronically enabling access to the functionality of the plurality of functionalities of the AR objects based on the set of objectives for the AR objects being completed. The time-sequenced manner is serial, in one example, such that after the set of objectives for a first AR object is completed via executing the functionalities of the first AR object, a second AR object is then electronically enabled such that functionalities of the second AR object are available for use by the user of the computing device. The time-sequenced unlocking of the AR objects continues until all AR objects have been unlocked, at which time, all functionalities are available for use.

In some examples, the electronic program provides for multiple AR objects to be unlocked simultaneously so that functionalities of multiple AR objects are available for use at the same time.

As a specific example, a first functionality of a first AR object includes face or body tracking within the camera feed, and the method 200 further includes displaying a second AR object in the camera feed using the face or body tracking during execution of the first functionality of the first AR object. One application includes displaying AR objects related to clothing that are overlaid onto a body of a user within the camera feed, for example. Many different functionalities exist and can be determined based on capabilities of the computing device.

Within examples described herein, the electronic program includes a guided journey through interactive activities for the user via the AR objects and associated functionalities. A type of content that is a subject of the interactive activities can be filtered to be specific to a product, a brand, a user, or data in a user profile, for example, and then a look and appearance of the AR objects is generated (e.g., dynamically or in a customized basis), for example. As a result, a personalized Within examples described herein, access to functionalities of the AR objects is described as being enabled in a time-sequenced manner. The time-sequenced manner can take many forms, such as hourly, daily, monthly, etc. or in any linear time scenario. In other examples, however, access to functionalities of the AR objects is allowed in ways unrelated to a specific time sequence, such as based on completion of certain objectives of a first AR object unlocking functionalities to a second AR object. Still further, access to functionalities of the AR objects can be allowed in a non-linear timeframe as well where access is provided to AR objects associated with days later in the month prior to access being provided to AR objects sooner in the month.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to explain the principles of the examples, the practical application, and to enable others of ordinary skill in the art to understand the disclosure for various examples with various modifications as are suited to the particular use contemplated.

Having described the subject matter of the present disclosure in detail and by reference to specific examples thereof, it is noted that the various details disclosed herein should not be taken to imply that these details relate to elements that are essential components of the various examples described herein, even in cases where a particular element is illustrated in each of the drawings that accompany the present description. Further, it will be apparent that modifications and variations are possible without departing from the scope of the present disclosure, including, but not limited to, examples defined in the appended claims. More specifically, although some aspects of the present disclosure are identified herein as preferred or particularly advantageous, it is contemplated that the present disclosure is not necessarily limited to these aspects.

Examples above describe implementations as methods performed by devices. In other examples, implementations take the form of a non-transitory computer-readable media having stored therein instructions, which when executed by a computing device having one or more processors causes the computing device to perform functions of the described methods.

In further examples, implementations take the form of a system comprising a computing device comprising one or more processors and non-transitory computer-readable media having stored therein instructions, which when executed by the one or more processors, causes the computing device to perform functions of the described methods.

Moreover, while some examples have been described in the context of fully functioning computers and computer systems, those skilled in the art will appreciate that various examples are capable of being distributed as a program product in a variety of forms, and that the disclosure applies equally regardless of a particular type of machine or computer-readable media used to effect the distribution.

Further examples of machine-readable storage media, machine-readable media, or computer-readable (storage) media include, but are not limited to, recordable type media such as volatile and non-volatile memory devices, floppy and other removable drives, hard drives, optical disks (e.g., Compact Disk Read-Only Memory (CD ROMS), Digital Versatile Disks, (DVDs), etc.), among others, and transmission type media such as digital and analog communication links.

For the purposes of describing and defining examples herein, it is noted that terms "substantially" or "about" are utilized herein to represent an inherent degree of uncertainty attributed to any quantitative comparison, value, measurement, or other representation. The terms "substantially" and "about," when utilized herein, represent the degree by which a quantitative representation may vary from a stated reference without resulting in a change in a basic function of the subject matter at issue.

What is claimed is:

1. A computer-implemented method for generating augmented reality (AR) objects for use to implement functions of an electronic program, the method comprising:
   receiving, at a computing device, an electronic program having objectives and associated rewards for completion of the objectives in a time-sequenced manner;
   generating augmented reality (AR) objects based on user data, wherein the AR objects are actionable via user input to provide a plurality of functionalities within the electronic program;
   generating the plurality of functionalities of the AR objects dynamically per user, wherein the plurality of functionalities are initially restricted for use by the computing device;
   determining, based on a camera feed received by the computing device, a viewpoint that depicts a real-world environment;
   based on initiation of the electronic program at the computing device, displaying the AR objects along with real images in the camera feed such that the real images are mixed with the AR objects and the AR objects are anchored to a physical location in the real-world environment; and
   electronically enabling access to a functionality of the plurality of functionalities of the AR objects in the time-sequenced manner based on meeting requirements for completion of the objectives.

2. The method of claim 1, wherein the electronic program includes content related to specific products, and the method further comprising:
   receiving the electronic program based on the user data being indicative of the specific products.

3. The method of claim 1, wherein the electronic program includes content related to specific products, and the method further comprising:
   generating the AR objects based on the specific products.

4. The method of claim 1, wherein the electronic program includes content related to a specific product, and the method further comprising:
   initiating the electronic program at the computing device based on performing an object recognition within a captured image of the specific product.

5. The method of claim 1, wherein the electronic program includes content related to a specific product, and the method further comprising:
   generating the plurality of functionalities to include a virtual try-on simulation of the specific product.

6. The method of claim 1, further comprising:
   determining a geographic location of the computing device; and
   generating the AR objects based on the geographic location such that an appearance of the AR objects represents aspects of the geographic location.

7. The method of claim 6, further comprising:
   generating the plurality of functionalities of the AR objects further based on contextual indicators including one of the geographic location, a time of year, and a time of day.

8. The method of claim 1, further comprising:
   generating the AR objects utilizing a generative neural network to create the AR objects in a customized manner to match a product or a brand that is a subject of the electronic program.

9. The method of claim 1, further comprising:
   generating the AR objects to have an appearance based on the user data.

10. The method of claim 1, wherein the AR objects are anchored to the physical location in the real-world environment that corresponds to an object in the camera feed.

11. The method of claim 1, further comprising:
    receiving an input from a touchscreen of the computing device indicating a location in the camera feed to position the AR objects that corresponds to the physical location in the real-world environment; and
    displaying the AR objects along with real images at the location in the camera feed.

12. The method of claim 1, wherein electronically enabling access to the functionality of the plurality of functionalities of the AR objects comprises:
    electronically enabling access to the functionality of the plurality of functionalities of the AR objects in the time-sequenced manner such that a single AR object is functional at a time.

13. The method of claim 1, wherein each of the AR objects has an associated set of objectives, and wherein electronically enabling access to the functionality of the plurality of functionalities of the AR objects comprises:
    electronically enabling access to the functionality of the plurality of functionalities of the AR objects based on the set of objectives for the AR objects being completed.

14. The method of claim 1, wherein a first functionality of a first AR object includes face or body tracking within the camera feed, and the method further comprises:
    displaying a second AR object in the camera feed using the face or body tracking during execution of the first functionality of the first AR object.

15. A non-transitory computer-readable media having stored therein executable instructions, which when executed by a computing device including one or more processors causes the computing device to perform functions comprising:
    receiving an electronic program having objectives and associated rewards for completion of the objectives in a time-sequenced manner;
    generating augmented reality (AR) objects based on user data, wherein the AR objects are actionable via user input to provide a plurality of functionalities within the electronic program;

generating the plurality of functionalities of the AR objects dynamically per user, wherein the plurality of functionalities are initially restricted for use by the computing device;

determining, based on a camera feed received by the computing device, a viewpoint that depicts a real-world environment;

based on initiation of the electronic program at the computing device, displaying the AR objects along with real images in the camera feed such that the real images are mixed with the AR objects and the AR objects are anchored to a physical location in the real-world environment; and electronically enabling access to a functionality of the plurality of functionalities of the AR objects in a time-sequenced manner based on meeting requirements for completion of the objectives.

16. The non-transitory computer-readable media of claim 15, wherein the electronic program includes content related to specific products, and the functions further comprise:

generating the AR objects based on the specific products.

17. The non-transitory computer-readable media of claim 15, wherein electronically enabling access to the functionality of the plurality of functionalities of the AR objects comprises:

electronically enabling access to the functionality of the plurality of functionalities of the AR objects in the time-sequenced manner such that a single AR object is functional at a time.

18. A system comprising:

one or more processors and non-transitory computer-readable media having stored therein instructions, which when executed by the one or more processors, causes the system to perform functions comprising:

receiving an electronic program having objectives and associated rewards for completion of the objectives in a time-sequenced manner;

generating augmented reality (AR) objects based on user data, wherein the AR objects are actionable via user input to provide a plurality of functionalities within the electronic program;

generating the plurality of functionalities of the AR objects dynamically per user, wherein the plurality of functionalities are initially restricted for use;

determining, based on a camera feed received, a viewpoint that depicts a real-world environment;

based on initiation of the electronic program, displaying the AR objects along with real images in the camera feed such that the real images are mixed with the AR objects and the AR objects are anchored to a physical location in the real-world environment; and electronically enabling access to a functionality of the plurality of functionalities of the AR objects in a time-sequenced manner based on meeting requirements for completion of the objectives.

19. The system of claim 18, wherein the electronic program includes content related to specific products, and the functions further comprise:

generating the AR objects based on the specific products.

20. The system of claim 18, wherein electronically enabling access to the functionality of the plurality of functionalities of the AR objects comprises:

electronically enabling access to the functionality of the plurality of functionalities of the AR objects in the time-sequenced manner such that a single AR object is functional at a time.

\* \* \* \* \*